United States Patent [19]

Bastian et al.

[11] 4,357,795
[45] Nov. 9, 1982

[54] MULTI-BURN SOLID FUEL RESTARTABLE ROCKET AND METHOD OF USE

[75] Inventors: Thomas W. Bastian; J. Sydney Roberts, both of Fullerton, Calif.

[73] Assignee: General Dynamics, Pomona Division, Pomona, Calif.

[21] Appl. No.: 140,056

[22] Filed: Apr. 14, 1980

[51] Int. Cl.³ .............................. F02K 9/12; F02K 9/22
[52] U.S. Cl. ......................................... 60/204; 60/245; 60/254
[58] Field of Search ................. 60/204, 244, 245, 254, 60/253; 102/100, 101, 102

[56] References Cited

U.S. PATENT DOCUMENTS

| | | |
|---|---|---|
| 1,074,809 | 10/1913 | Newton . |
| 2,814,179 | 11/1957 | Edelman et al. . |
| 3,010,400 | 11/1961 | Guay . |
| 3,023,570 | 3/1962 | Crouch . |
| 3,052,092 | 9/1962 | Kirkbride . |
| 3,065,596 | 11/1962 | Schultz . |
| 3,073,242 | 1/1963 | Hewson . |
| 3,093,964 | 6/1963 | Hausmann . |
| 3,107,620 | 10/1963 | O'Donnell . |
| 3,128,600 | 4/1964 | Oldham . |
| 3,137,126 | 6/1964 | Madison . |
| 3,165,060 | 1/1965 | Braun et al. . |
| 3,217,651 | 11/1965 | Braun et al. . |
| 3,248,875 | 5/1966 | Wolcott .............................. 60/254 |
| 3,293,855 | 12/1966 | Cuttill et al. . |
| 3,429,265 | 2/1969 | Longwell et al. . |
| 3,457,726 | 7/1969 | Trotel . |
| 3,568,448 | 3/1971 | Webb . |
| 3,585,799 | 6/1971 | Geschwenter . |
| 3,677,010 | 7/1972 | Fink et al. . |
| 3,857,239 | 12/1974 | Brock et al. .......................... 60/204 |

Primary Examiner—Robert E. Garrett
Attorney, Agent, or Firm—Henry M. Bissell; Edward B. Johnson

[57] ABSTRACT

A multi-burn restartable solid rocket fuel having plural layers, each independently ignitable, including a central core, and at least one outer cylindrical layer separated from the central core by a non-ignitable layer, and the method of utilization therefor including first igniting the central core in an end burned configuration, and subsequently or concurrently igniting the next adjacent layer or layers in an end burned configuration, as desired.

17 Claims, 7 Drawing Figures

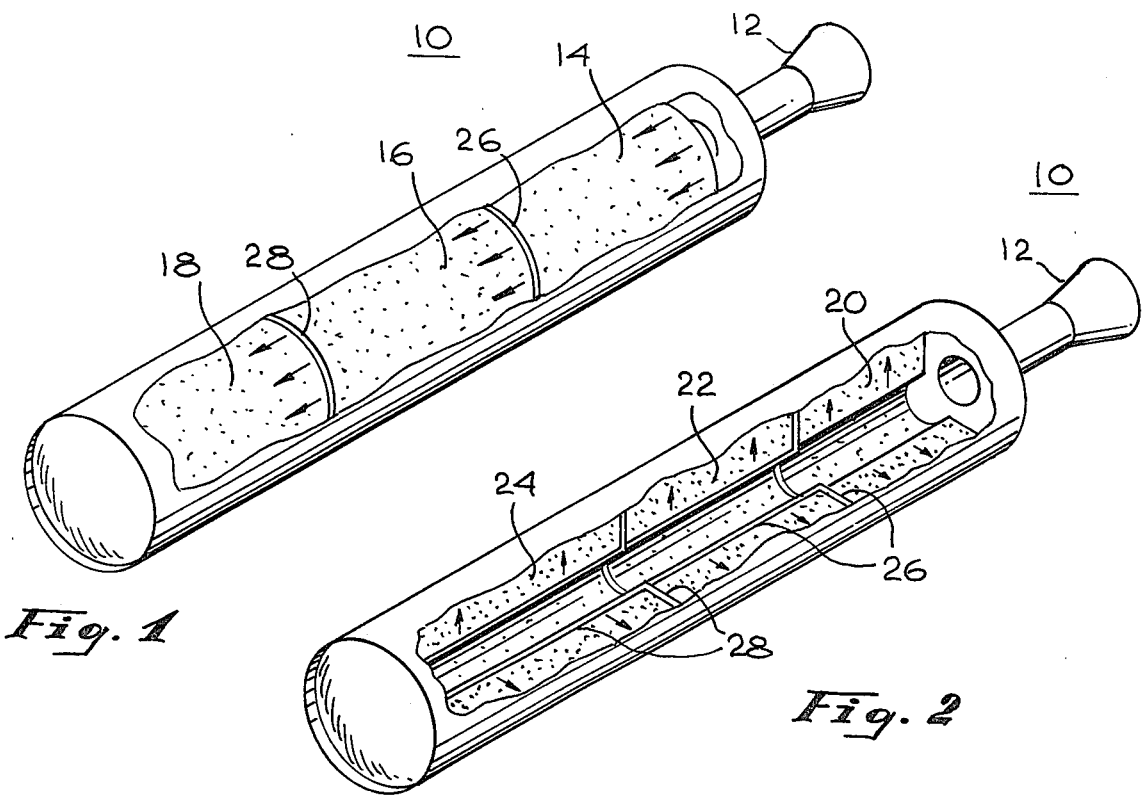
Fig. 1
Fig. 2
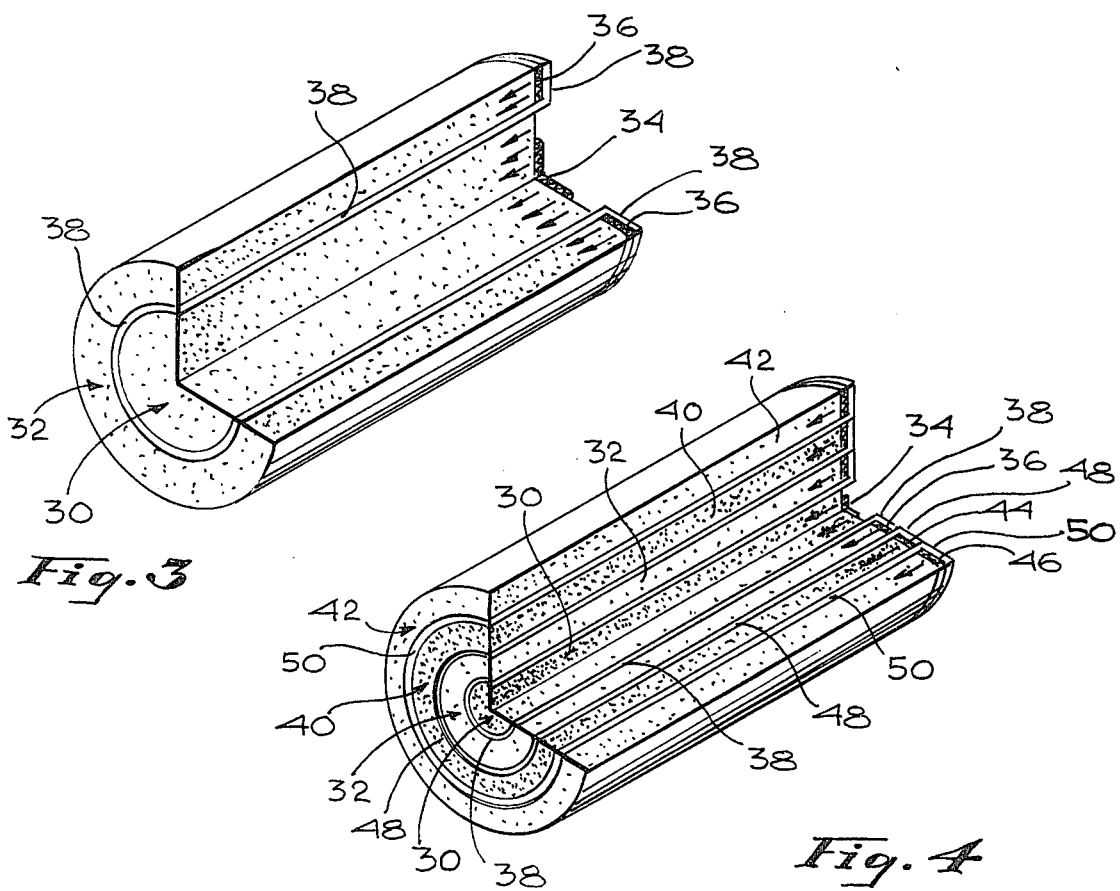
Fig. 3
Fig. 4

MULTI-BURN SOLID FUEL RESTARTABLE ROCKET AND METHOD OF USE

BACKGROUND OF THE INVENTION

1. Field of the Invention.

The present invention relates to solid fuel rocket propulsion systems providing for greater flexibility in the use of the rockets, improved fuel to volume ratios, and multiple restart provisions to provide flexible thrust level and timing of ignition of the rocket.

2. Description of the Prior Art.

There are numerous designs for solid state rocket motors which describe various configurations of different propellant grains located in the rocket motor body. For example, U.S. Pat. No. 3,023,570 to Crouch describes a rocket or rocket motor having a variable thrust motor. In the patent, variable thrust is provided by either rods or concentric tubes of differing propellant charges which are ignited in an end burn character, and the propellant charges cause the variable thrust. Thus, it is known in the art to provide different types of charges of propellant in a single rocket motor, and to utilize this variable to adjust the thrust. However, these known variations obviously, for what would essentially be a plural stage rocket, require completely separate stages in the conventional manner.

In U.S. Pat. No. 3,065,596 to Schultz, a multi-stage solid fuel rocket is provided. This unit, however, utilizes specific design characteristics, requiring a relatively large unused center section of the rocket for gas flow and to control the pressure in the system. These features are provided in order to control ignition of the propellant. Thus the system requires a large rocket and wastes considerable space in the center thereof.

In Cuttill et al. U.S. Pat. No. 3,293,855, the concept of multiple coaxial layers of propellant is disclosed. The patent describes a reignitable rocket, but in order to provide the reignition, provides the same hollow central core noted above, and thus produces a less efficient unit.

One means of at least partially overcoming the problem of the utilization of a large hollow central section is disclosed in U.S. Pat. No. 3,128,600 to Oldham. In this unit, various precast sections of propellant are provided for radial burning and are separately ignitable. However, this radial burn characteristic requires a small hollow tubular central section to provide for exhaust of at least some of the gases, and the provision of fuses to ignite the various layers of propellant.

U.S. Pat. No. 3,457,726 to Trotel discloses a multilayer incrementally controllable-thrust propulsion device, but layers the propellant in the unit in such a manner that multiple pulses produce sequential burning of one layer of propellant at a time. This structure overcomes the problem of the weight situation, but provides limited surface area for burning and propulsion of the rocket, at a given time.

Numerous other concentric layers of propellant material are disclosed in the art, see for example U.S. Pat. No. 3,568,488 to Webb, U.S. Pat. No. 3,677,010 to Fink et al, and 3,857,239 to Brock et al. All of these disclose systems including plural layers for successive concentric burning of the propellant. However, all of these also require a large hollow central area which is needed to exhaust the propulsion gases, and thus do not make effective use of the space in the rocket chamber.

In U.S. Pat. No. 3,052,092, a solid propellant rocket motor with plural concentric layers is disclosed. However, in this case, a very slow burning external concentric layer is provided to protect the area near the nozzle of the rocket, and thus, even in the variable burning status, the need for multiple restarts is not met.

Another means for providing this multiple restart is shown in U.S. Pat. No. 3,093,964 to Hausmann which discloses a two-stage rocket which uses a plurality of propellant rods, arranged in such a manner that the external series of rods forms a disposable chamber, for an initial propulsion, and after disposal of the chamber, the internal series of rods is utilized for subsequent sequential end burning. This system, as is obvious, requires extra structural design considerations, and extra weight is produced by the design. Further, as in the other art, the resulting system does not maximize the use of the central core of the rocket motor; an air space being necessarily provided between each of the rods.

It is thus highly desirable to design a rocket motor of the solid fuel type which has the burn flexibility of the radial burn motors, described above, which allow for pulses of power, and has the high volumetric efficiency provided in the end burn configurations. Such a design would provide either a smaller motor for a given amount of thrust, or more thrust in an equivalent size motor. These are two of the major objects of the present invention which are achieved by the instant design.

SUMMARY OF THE INVENTION

The rocket motors of the present invention are designed to provide restartable solid fuel motors which are flexible in thrust profile and ignition timing and have a very high volumetric efficiency. In order to accomplish this, plural separate concentric segments of propellant are provided at the first burn stage of the rocket. These concentric stages are fired from the inside out, the first firing taking place in the solid concentric core either individually, or jointly with the next adjacent external propellant section(s). In this embodiment of the present invention, a minimum of two sections are required, i.e. the solid central section, and the external section wrapping totally around the solid center section, but even more stages or sections may be provided for this initial burning area. Burning is started by standard initiation means, known in the art, such as a capacitor charging unit, and is of the end burn type at least in the central section. End burning is the burning of a rod or tube of propellant in a direction parallel to the axis of the rod or tube, and in a direction away from the nozzle of the rocket motor. This central core may be ignited individually, or may be a ignited with the next adjacent member for more initial power. Alternatively, external layers of propellant may be held in abeyance for future firing. Each of the layers of propellant in the restartable multi-burn solid fuel rocket motor is separated from the next propellant layer by a burn inhibiting layer, which is usually the binder for the propellant, as described hereinbelow.

This plural layer, first section of the motor of the present invention may be used alone, or in combination with additional layers, and the outer layer of the first section or stage may be individually fired, or may be, if desired, integral with a second section of propellant whereby, when the outer layer is ignited, burning progresses through the outer layer and ignition is automatically initiated in a second or later stage.

In addition, it is also possible to provide for conventional radial burn of the outer tubular layers in the rocket of the present invention. However, before initiating radial burn of the outer layers, the central core must be burned to expose the ignitable surface of the innermost radial burn section. In this form the radial burn section is ignited along the whole of its surface for maximum thrust.

In another embodiment of the present invention, a first solid stage of end burn propellant is provided, for example, for lift off of the rocket, and thereafter the plural layer solid core system described previously is provided. In this form, lift off and initial firing is provided by a full end burn propellant charge, and the central core of the second section is either burned out as a continuation of the end burn lift off section, or may be separated from the initial lift off section and ignited as a second stage, or burn, to provide the initially solid and subsequently hollow plural stage multi-start rocket of the present invention.

BRIEF DESCRIPTION OF THE DRAWING

A better understanding of the present invention may be had from a consideration of the following detailed description, taken in conjunction with the accompanying drawing in which:

FIG. 1 is a partially cutaway view of a staged end burn rocket of the prior art;

FIG. 2 shows a partial cutaway schematic of a radial burn rocket, also known in the art;

FIG. 3 is a cut-away diagram of a two-layer embodiment of the present invention;

FIG. 4 is a diagram of a four-layer embodiment of the present invention;

DESCRIPTION OF THE PREFERRED EMBODIMENTS

Figure 5:
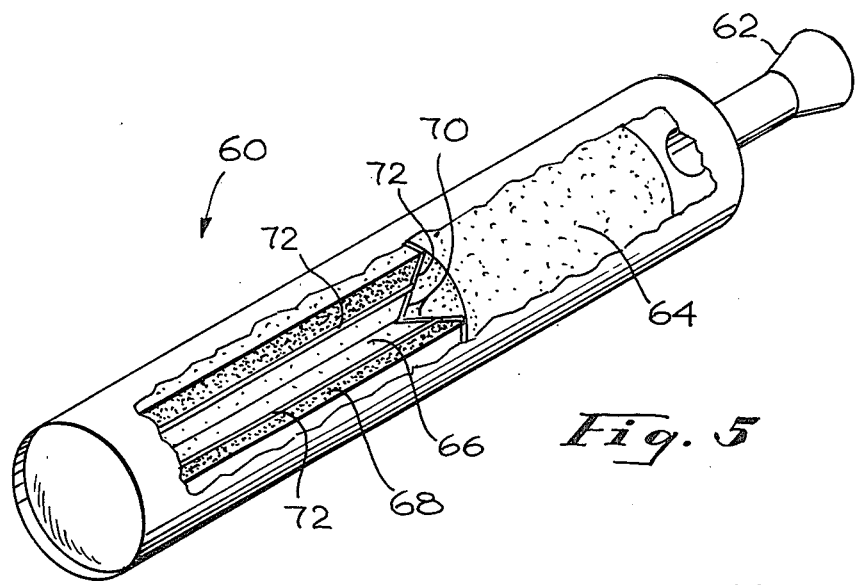
FIG. 5 is a schematic partial cutout of an embodiment utilizing initial end burn and the layered structure, resulting in a three-burn motor.

In FIGs. 1 and 2, partial cutout schematics of the typical prior art types of solid fuel multi-stage restartable rockets are provided. In these FIGS. rocket 10 is provided with nozzle 12, and particularly in FIG. 1, is provided with three stages of propellant, 14, 16 and 18. These are ignited by separate combustion initiators, not shown. Combustion of first stage 14 travels longitudinally (end burn), as shown by the arrows, through section 14 to burn inhibitor 26, at which point the burning ceases. At a desired later time, or even immediately, burning is initiated for section 16 and proceeds longitudinally down section 16 to burn inhibitor 28, and thereafter at a desired time section 18 of the propellant is burned for a third stage propulsion. This system, however, does not have the flexible power characteristics, as the only means of varying thrust is by the burn rate at which each section burns, and the thrust for each section is fixed by the design and the propellant charge.

In order to alleviate this, the prior art turned to a radial burn structure, as shown in FIG. 2. In this system, rocket 10 is provided with the same nozzle 12, and cylindrical propellant sections 20, 22 and 24 are provided. These are separated by burn inhibitors, shown as 26 and 28. In operation, propellant section 20 is ignited by an ignitor, not shown, and radially burns, in an outward direction until completely burned away. Burn inhibitor 26 prevents the ignition of propellant 22 until it is subsequently desired to ignite propellant 22. After ignition of propellant 22, by an ignitor, not shown, located on the cylindrical inner surface of propellant 22, it also burns radially to completion. Burn inhibitor 28 has prevented propellant section 24 from burning, so that it can also be independently ignited, and thus provide a third stage of burning. This radial design provides for somewhat more flexibility than the end burn system, as it provides the ability to ignite more than one segment at one time and provides a higher surface area and thus higher thrust on the burning of the individual stages, but it lacks the volumetric efficiency of the end burn solid fuel system shown in FIG. 1, as it does not utilize the whole of the internal space of the rocket motor for propellant.

FIG. 3, on the other hand, shows the simplest preferred embodiment of the present invention. In this embodiment, two separate sections of propellant grain are provided. The first propellant section 30 is shaped as a core or rod of material, is fired by ignitor 34 for end burn, as indicated by the arrows, and is separated from the outer tubular section of propellant 32 by burn inhibitor 38. The outer tubular shell of propellant 32 is also provided with an ignitor 36 and, after ignition, burns is an end burn configuration. Burn inhibitor layer 38 also covers ignitor 36 to prevent ignition of propellant shell 32 during burning of core 30. In this manner, a solid propellant multi-stage rocket motor is provided with no waste space, while combining the advantages of the normal end burn design and the hollow core radial burn design.

The propellant, in accordance with the present invention, may be any of those normally utilized in industry, such as ammonium perchlorate with a suitable binder base such as a rubber type material. The barrier material, on the other hand, may be a silica-based material, such as those known in the art, or may be the same binder or base as the propellant, with the omission of the propellant and the propellant oxidizer material to form the non-ignitable portion of the motor. In the alternative, in this particular configuration, the outer shell may be ignited in a radial configuration after ignition of the central core and thus provide a different second stage. However, radial burn of the outer section does not provide the flexibility of parallel end burning. This particular burning arrangement also does not eliminate the possibility of end burn for the second section, and further does not eliminate the possibility of activation of ignitors 34 and 36 at the same time or of igniting the outer shell prior to the completion of burning of the inner core to thereby provide additional thrust. Thus, with the electronics known in the art, a rocket may be designed which will allow for very flexible proplusion with merely the changing of the external circuitry which determines the time of ignition of the various sections.

In FIG. 4, a multi-layered system of the present invention, wherein four separate layers of propellant are utilized is illustrated. It should be noted, at this point, that the limitations on the number of layers is a matter of function of the design, and the size of the rocket. Thus, the objects of the present invention may be accomplished by the provision of more than two layers, and the upper limit of the number of the layers is dependent solely upon the above factors, as well as the design characteristics preferred for the particular application.

In FIG. 4, the central core of propellant 30 is surrounded by burn inhibitor 38 and is fired by ignitor 34. The first outer shell of propellant 32 is separated from the other shells by burn inhibitor 38 and 48, and is independently fired by ignitor 36. The third layer of propellant 40 is encapsulated by burn inhibitor layers 48 and 50, and is fired by independent ignitor 44. Finally, outer propellant layer 42 is separated from the inner layers by burn inhibitor layer 50, and ignited by the firing of ignitor 46. It should be noted, at this point, that the ignitors are shown schematically, and the electrical connections have not been shown. The particular ignitors and electrical connections are well known in the art and can be selected in accordance with the particular propellant/oxidizer utilized, and other desired design features.

In this form of the present invention, inner core 30 must be fired first, but may be fired in combination with propellant layer 32, layers 32 and 40 or even propellant layers 32, 40 and 42. In this form, on site selection of the thrust level desired for the initial burning stage may be selected, so long as all of the propellants ignited are next adjacent each other, and the inner core is ignited initially. In the alternative, propellant core 30 may be individually ignited, for example, for lift off, and a second stage of thrust provided by the separate ignition of propellant layer 32, or propellant layer 32 and propellant layer 40. In this form a second stage of two different levels of thrust may be provided. Finally, for instance, in order to propel the rockets utilizing the fuel system of the present invention during terminal intercept maneuvers, propellant layer 42 may be fired from an external signal, or in accordance with logic circuits for acquisition and destruction of targets, all of which are known in the art.

In FIG. 5, another alternative design of the fuel system of the present invention is detailed. In this figure, rocket 60 is provided with standard rocket nozzle 62 and is further provided with a standard end burn propellant section 64 which is used, for example, for lift off of the rocket. Propellant 64 is separated from the core 66 and external shell of propellant 68 by burn inhibiting barriers 70 and 72, and thus after ignition and lift off, for example, thrust of section 64 would terminate. Then at a selected or predetermined time, internal core 66 is ignited by separate ignition means (not shown) and end burned as in FIG. 3. This would provide a second stage of thrust in a given rocket unit, and again provide for a complete solid propellant unit having no central hollow core. Outer shell of propellant 68 is separated from the inner core by burn inhibiting layer 72 and thus outer shell 68 may be utilized, as before, to direct the rocket utilizing the present system to its target upon receipt of an external signal, or at the direction of the circuitry system of the rocket. With the inherent burn policy of the present invention propellant segments 66 and 68 can be ignited simultaneously to provide a single thrust segment of greater level than either segment 66 or segment 68 alone.

Figure 6:
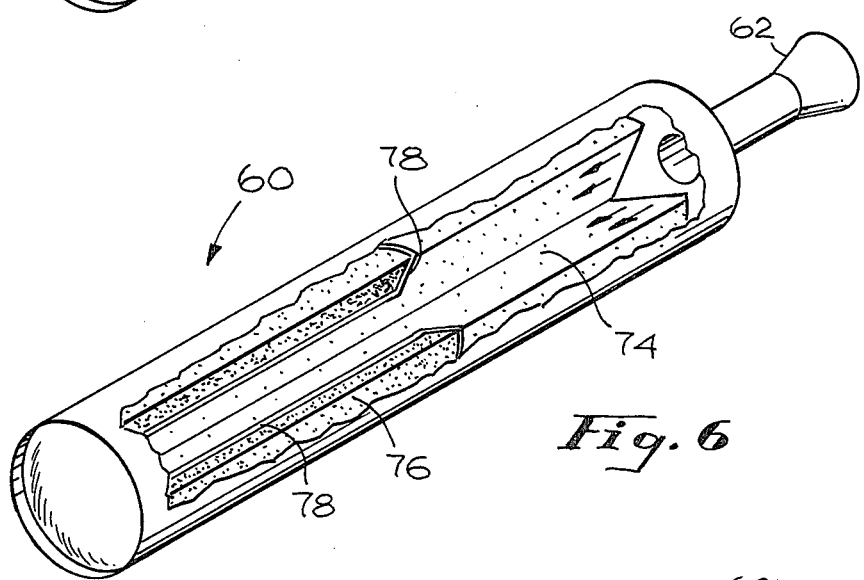
FIG. 6 is another enbodiment of the initial end burn and subsequent restarting structure in a two-burn configuration.

In FIG. 6, a system very similar to that shown in FIG. 5, providing for initial thrust of longer duration, is provided. In this format, rocket 60 has a conventional nozzle 62, and an end burn solid propellant section 74 which completely fills the first portion of the combustion chamber, but forms a smaller core section at its upper end and is insulated from second stage propellant external shell 76 by burn inhibitor 78. In this format, propellent 74 is ignited on the exposed surface adjacent to nozzle 62 by an ignitor (not shown), and burns in the direction of the arrows providing a dual thrust, boost/sustain thrust profile, until such burning is completed. Then, at a preselected, or at a subsequently transmitted time, another ignitor (not shown) initiates firing of the second section of propellant 76 in order to further propel, and direct the rocket to its target.

Figure 7:
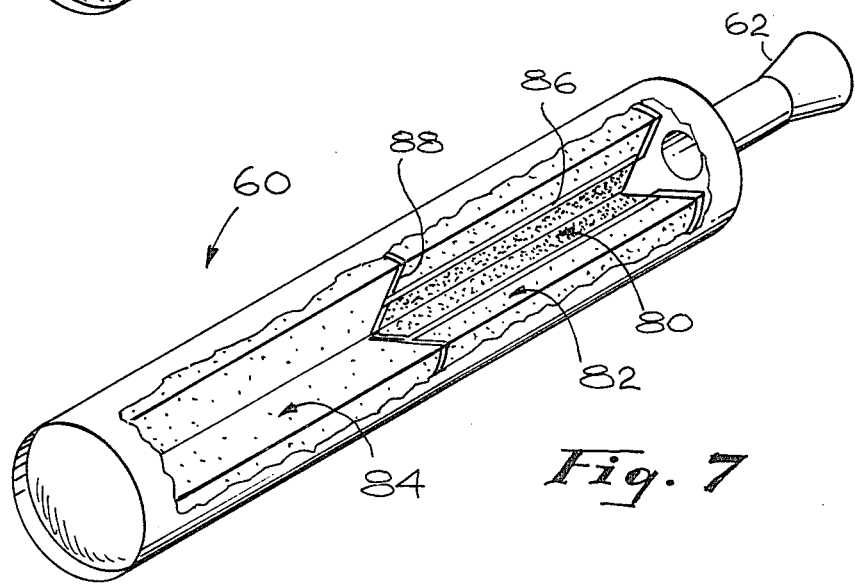
FIG. 7 is another schematic partial cutout of another embodiment of the present invention.

In the embodiment shown in FIG. 7, a two-stage version of the propellant design and method of the present invention is shown. In this system, rocket 60 and nozzle 62 contain central propellant core 80 which is ignited in the first step by an ignitor which is not shown. Central core 80 is surrounded by inhibitor 86, and second propellant layer 82. In this form, the central core can be fired initially, and then the outer shell 82 fired in either an end burn or a radial burn configuration depending on the particular design implementation. The rocket is further provided with end burn solid propellant section 84 which substantially fills the chamber of the rocket motor, and is separated from core 80 and shell 82 by burn inhibiting layer 88. This then forms a third, very strong thrust level when fired in accordance with the present invention.

In addition, the portion of burn inhibitor 88 between outer shell 82 and third stage 84 may be omitted so that only a single second ignition of shell 82 is required, and thereafter, thrust will be provided through the burning of the whole of shell 82, and third section 84, providing a low-high thrust profile.

In utilizing the solid rocket motors of the present invention, for example, when it is desired to provide a rocket which can, upon signal, turn quickly and intercept a rapidly moving target, a very short duration high thrust (and all boost system) is desirable. In this design, for example, the unit of FIG. 4 could be used, with all four segments being fired simultaneously for quick acceleration and minimum time to target. For a high altitude target, the first two or three segments could be burned sequentially to propel the rocket to close proximity to the target, while retaining the final propellant segment or segments for thrusting during terminal maneuvers to increase missile responsiveness and maneuverability.

Further, by spacing the burns, with intervals of coasting between thrusts, high peak velocities inherent in all boost type motors are avoided, and there is a resulting increase in range and reduced dynamic air heating so that thermal protective systems are not always necessary. Additionally, burning all proplusion segments at approximately the same thrust levels allows more efficient use of the propellant than the boost-sustain thrust profile used in prior art solid fuel rockets to avoid peak velocities.

Although there have been described above specific arrangements of a multi-burn solid fuel restartable rocket and method of use in accordance with the invention for the purpose of illustrating the manner in which the invention may be used to advantage, it will be appreciated that the invention is not limited thereto. Accordingly, any and all modifications, variations and equivalent arrangements which may occur to those skilled in the art should be considered to be within the scope of the invention.

What is claimed is:

1. a multi-burn solid fuel restartable rocket motor comprising:

a motor housing of tubular shape;

a nozzle adjacent said housing for transmission of exhaust gases;

a multi-layer propellant comprising a central solid core of propellant and at least one concentric layer of propellant separated by a burn inhibiting barrier effective to prevent burning between said layers; and ignition means capable of independently igniting each layer individually and producing end burning of at least said solid core.

2. The rocket motor of claim 1 wherein the propellant comprises at least three concentric layers, each separated by a burn inhibiting layer, and each having independent ignition means.

3. The rocket motor of claim 1 wherein each of said ignition means produces end burning.

4. The rocket motor of claim 1 wherein the ignition means for said core and the first layer surrounding said core produce end burning.

5. The rocket of claim 1 wherein the ignition means for the layers external to said core produce radial burning.

6. The rocket motor of claim 1 wherein a first end burn solid state propellant is provided in said housing for ignition prior to the ignition of said multilayer propellant.

7. The rocket motor of claim 6 wherein said additional propellant and said central core comprise a first stage of burning.

8. The rocket motor of claim 7 wherein the independent ignition means produces radial burning in propellant surrounding the central core.

9. The rocket motor of claim 1 comprising an additional stage of propellant for ignition and burning subsequent to the ignition and burning of said multilayer propellant.

10. A method of propelling a solid fuel rocket comprising:

providing a rocket body of substantially tubular shape with at least one exhaust nozzle for the provision of gas flow for propulsion;

providing a plurality of concentrically arranged, cylindrical, independently ignitable fuel units separated by a burn inhibiting layer, the innermost unit being rod shaped;

igniting the innermost unit in an end burn configuration for initial propulsion of said rocket; and subsequently igniting at least the innermost of the remaining units for propulsion.

11. The method of claim 10 further comprising end burning in the subsequent ignition.

12. The method of claim 10 further comprising radial burning in the subsequent ignition.

13. The method of claim 10 wherein said innermost unit is ignited first, followed by ignition of the second unit, followed by the ignition of at least one third unit positioned concentric with said first and second units, and external to said first and second units.

14. The method of claim 10 wherein the initial propulsion of said rocket is provided by an additional stage of end burn propellant which is ignited and burned prior to ignition of the innermost unit.

15. The method of claim 14 wherein the ignition of the subsequently ignited unit is peformed by radial burning.

16. The method of claim 10 wherein initial propulsion is provided by the end burning of a first solid propellant which constitutes an extension of said innermost unit, and further comprising burning said innermost unit during said initial propulsion.

17. The method of claim 10 wherein after the ignition of said concentrically arranged fuel units, a subsequent coaxial fuel unit is ignited in an end burn configuration.

* * * * *